(12) United States Patent
Inagaki et al.

(10) Patent No.: US 7,914,941 B2
(45) Date of Patent: Mar. 29, 2011

(54) SOLID OXIDE FUEL CELL AND MANUFACTURING METHOD THEREOF

(75) Inventors: Toru Inagaki, Amagasaki (JP); Hiroyuki Yoshida, Amagasaki (JP); Tsunehisa Sasaki, Amagasaki (JP); Kazuhiro Miura, Osaka (JP); Takehisa Fukui, Nagoya (JP); Satoshi Ohara, Nagoya (JP); Kei Hosoi, Naka-gun (JP); Koji Hoshino, Naka-gun (JP); Kazunori Adachi, Naka-gun (JP)

(73) Assignees: The Kansai Electric Power Co., Osaka (JP); Japan Fine Ceramics Center, Aichi (JP); Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 12/576,472

(22) Filed: Oct. 9, 2009

(65) Prior Publication Data

US 2010/0021792 A1 Jan. 28, 2010

Related U.S. Application Data

(63) Continuation of application No. 10/860,031, filed on Jun. 4, 2004, now abandoned, which is a continuation-in-part of application No. PCT/JP02/12641, filed on Dec. 3, 2002.

(30) Foreign Application Priority Data

Dec. 4, 2001 (JP) .................................. 2001-369791

(51) Int. Cl.
*H01M 4/90* (2006.01)
*H01M 8/12* (2006.01)

(52) U.S. Cl. ......... 429/486; 429/489; 429/495; 429/535
(58) Field of Classification Search .................... 429/30, 429/31, 33, 40, 44, 45, 486, 489, 495, 535
See application file for complete search history.

(56) References Cited

U.S. PATENT DOCUMENTS

| | | | |
|---|---|---|---|
| 6,004,688 A | 12/1999 | Goodenough et al. | 429/33 |
| 6,287,716 B1 | 9/2001 | Hashimoto et al. | 429/33 |
| 6,319,626 B1 * | 11/2001 | Wallin et al. | 429/45 |
| 6,946,213 B2 | 9/2005 | Seabaugh et al. | 429/40 |
| 7,033,690 B1 | 4/2006 | Akikusa et al. | 429/30 |

FOREIGN PATENT DOCUMENTS

| | | |
|---|---|---|
| EP | 1 081 778 | 3/2001 |
| EP | 1 453 132 | 1/2004 |
| JP | 11-297333 | 10/1999 |
| JP | 2001-256986 | 9/2001 |

* cited by examiner

*Primary Examiner* — Stephen J. Kalafut
(74) *Attorney, Agent, or Firm* — Wenderoth, Lind & Ponack, L.L.P.

(57) ABSTRACT

An electric power generation cell 1 is constituted by arranging a fuel electrode layer 4 on one side of a solid electrolyte layer 3 and an air electrode layer 2 on the other side of the solid electrolyte layer 3. The solid electrolyte layer 3 is constituted of an oxide ion conductor mainly composed of a lanthanum gallate based oxide. The fuel electrode layer 4 is constituted of a porous sintered compact having a highly dispersed network structure in which a skeletal structure formed of a consecutive array of metal grains is surrounded by mixed conductive oxide grains. For the air electrode layer 2, a porous sintered compact mainly composed of cobaltite is used. This configuration reduces the overpotentials of the respective electrodes and the IR loss of the solid electrolyte layer 3, and accordingly can actualize a solid oxide type fuel cell excellent in electric power generation efficiency.

5 Claims, 1 Drawing Sheet

SOLID OXIDE FUEL CELL AND MANUFACTURING METHOD THEREOF

This is a continuation application of U.S. patent application Ser. No. 10/860,031, filed Jun. 4, 2004, now abandoned, which is a Continuation-In-Part of International Application No. PCT/JP02/12641, filed Dec. 3, 2002, now abandoned.

TECHNICAL FIELD

The present invention relates to a solid oxide fuel cell which is provided with an electric power generation cell constituted by arranging a fuel electrode layer on one side of a solid electrolyte layer and an air electrode layer on the other side of the solid electrolyte layer, in particular, to reduce the electrode overpotential (polarization) in the electric power generation cell of the fuel cell.

BACKGROUND OF THE INVENTION

Development of the solid electrolyte type fuel cell having a laminated structure for which the solid electrolyte layer composed of an oxide ion conductor is sandwiched between an air electrode layer (oxidant electrode layer) and a fuel electrode layer is progressing as the fuel cell for use in the next (third) generation electric power production. In a solid electrolyte type fuel cell, oxygen (air) is supplied to an air electrode section and a fuel gas ($H_2$, CO, and the like) is supplied to a fuel electrode section. Both the air electrode and the fuel electrode are made to be porous so that the gases may reach the interface between the air electrode and the solid electrolyte and the interface between the fuel electrode and the solid electrolyte.

The oxygen supplied to the air electrode reaches the neighborhood of the interface in contact with the solid electrolyte layer through the pores in the air electrode layer, and in that portion, the oxygen receives electrons from the air electrode to be ionized into oxide ions ($O^{2-}$). The oxide ions move by diffusion in the interior of the solid electrolyte layer toward the fuel electrode. The oxide ions reach the neighborhood of the interface in contact with the fuel electrode and in that portion, the oxide ions react with the fuel gas to produce reaction products ($H_2O$, $CO_2$ and the like), and release electrons to the fuel electrode.

The electrode reaction when hydrogen is used as fuel is as follows:

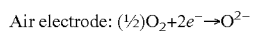

Air electrode: $(½)O_2 + 2e^- \rightarrow O^{2-}$

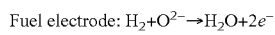

Fuel electrode: $H_2 + O^{2-} \rightarrow H_2O + 2e^-$

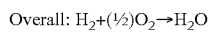

Overall: $H_2 + (½)O_2 \rightarrow H_2O$

Because the solid electrolyte layer is the medium for migration of the oxide ions and also functions as a partition wall for preventing the direct contact of the fuel gas with air, the solid electrolyte layer has a dense structure capable of blocking gas permeation. It is required that the solid electrolyte layer has high oxide ion conductivity, and is chemically stable and strong against thermal shock under the conditions involving the oxidative atmosphere in the air electrode section and the reductive atmosphere in the fuel electrode section. As a material which can meet such requirements, generally a stabilized zirconia (YSZ) substituted with yttria is used.

On the other hand, the air electrode (cathode) layer and fuel electrode (anode) layer, both being electrodes, need to be formed of materials having high electronic conductivity. Because the air electrode material is required to be chemically stable in the oxidative atmosphere at high temperatures around 700° C., metals are unsuitable for the air electrode, and generally perovskite type oxide materials having electronic conductivity are used, specifically $LaMnO_3$, $LaCoO_3$ and the solid solutions in which part of the La component in these materials is replaced with Sr, Ca and the like. Moreover, the fuel electrode material is generally a metal such as Ni and Co, or a cermet such as Ni-YSZ, and Co-YSZ.

The electric discharge reaction in the so-called fuel cell proceeds irreversibly, and the larger the current is taken out from the cell to the outside, the more the irreversibility increases and the more the cell voltage falls. The maximum voltage obtainable in an actual fuel cell is the equilibrium electromotive force and the voltage falls with increasing irreversibility.

Such a voltage fall is caused by the diffusion-movement resistance of the electrons in the fuel electrode layer and the air electrode layer, in other words, by the ionization reaction rate of the oxide ion, and the potential deviation from the equilibrium potential in each of the air electrode layer and the fuel electrode layer is called overpotential (polarization). Electrons flow in the electrodes and ions flow in the electrolyte, and thus electric current flows to the outside. Hence, there will be a voltage loss (IR loss) corresponding to the product of the current flowing in the cell and the contact resistances between the solid electrolyte layer and the respective electrode layers and the electric resistances of the electrode materials themselves and solid electrolyte layer itself, etc., the IR loss increases proportional to the current taken out from the cell.

Incidentally, in a fuel cell, in order to raise the voltage to be taken out, a cell stack is used in which a number of electric power generation cells (single cells) are jointed in series with interconnectors; however, in this case the electric resistance of the interconnectors themselves also causes the IR loss.

All the energy corresponding to the difference between the potential converted from the thermal energy obtained by combustion of the fuel and the potential which can be taken out from an electric power generation cell is vainly released as thermal energy from the electric power generation cell of a fuel cell. Therefore, the overpotential of each of the above described electrodes and the amount of the IR loss inside each electric power generation cell will influence the electric power generation efficiency of a fuel cell greatly.

FIG. 2 shows the relation between the voltage and current density which can be taken out from a single cell. As shown in the figure, the voltage which can be taken out from a single cell falls from the equilibrium electromotive force of the cell by the voltage corresponding to the sum of the absolute overpotential values and the IR losses in the fuel electrode layer and the air electrode layer; as aforementioned, the fall of the voltage becomes large with increasing current density.

The overpotential is especially large in the fuel electrode in a solid oxide type fuel cell which uses for the electrolyte an oxide ion conductor mainly composed of a lanthanum gallate based oxide; the fuel electrode overpotential in current fuel cells is generally of the order of 100 to 150 mV, presumably exceeding 150 mV as the case may be. If the working voltage of an electric power generation cell is set to be of the order of 0.7 V (corresponding to the current density of about 2 A/cm² in FIG. 2), the effect of the above described overpotential value of 100 to 150 mV on the voltage of 0.7 V is very large, and room is still left for improvement of the countermeasure against the electrode overpotential.

Especially the IR loss is largely affected by the electric resistance of the solid electrolyte layer and the contact resistance thereof with the electrodes, and accordingly a number of studies have hitherto been made on the materials and the layer thickness thereof.

SUMMARY OF THE INVENTION

The present invention takes as its object the provision of a high performance solid oxide fuel cell aiming at improvement of the electric power generation efficiency by reducing the electrode overpotentials, and a manufacturing method of the solid oxide fuel cell.

More specifically, a first aspect of the present invention includes a solid oxide fuel cell comprising an electric power generation cell (1) constituted by arranging a fuel electrode layer (4) on one side of a solid electrolyte layer (3) and an air electrode layer (2) on the other side of the solid electrolyte layer (3), wherein the above described solid electrolyte layer (3) is an oxide ion conductor mainly composed of a lanthanum gallate based oxide, the above described fuel electrode layer (4) is a porous sintered compact having a highly dispersed network structure in which a skeletal structure formed of a consecutive array of metal grains is surrounded by mixed conductive oxide grains, and the above described air electrode layer (2) is a porous sintered compact mainly composed of cobaltite.

Additionally, a second aspect of the present invention is the solid oxide fuel cell according to the first aspect of the present invention, wherein the above described solid electrolyte layer (3) is a lanthanum gallate based oxide having a perovskite structure represented by $La_xSr_{1-x}Ga_yMg_{1-Y-Z}M_ZO_{3-\delta}$, where $0.5<X<1$, $0.7<Y<1$, and $0<Z<0.1$ (here, M denotes one or more types of metallic elements selected from the group consisting of Co, Fe, and Ni, and 3-δ denotes the number of oxygen atoms), the above described fuel electrode layer (4) comprises a skeletal structure formed of a consecutive array of metal grains, of 0.9 μm or less in average grain size, of at least one type selected from the group consisting of Ni, Pt and Ru, and the above described mixed conductive grains are made of an oxide containing cerium represented by $CeO_2$ or $(CeO_2)_{1-a}(LO_n)_a$ where $0<a<0.4$ (here, L denotes at least one type of cation selected from the group consisting of a monovalent alkali metal cation, a divalent alkaline earth metal cation and a trivalent rare earth element cation, and n denotes the number of oxygen atoms).

Additionally, a third aspect of the present invention is a solid oxide fuel cell according to the first or second aspect of the present invention, wherein the above described air electrode layer (2) is made of an oxide mainly composed of samarium strontium cobaltite having a perovskite structure represented by $Sm_cSr_{1-c}CoO_{3-\gamma}$ where $0.1<c<0.9$ (here, 3-γ denotes the number of oxygen atoms).

Additionally, a fourth aspect of the present invention resides in that the fuel electrode layer (4) according to any one of the first, second and third aspects of the present invention is manufactured by sintering, in an oxidative atmosphere at a temperature of 900° C. to 1,500° C., a powder having a highly dispersed network structure in which mixed conductive oxide grains, produced by the spray thermal decomposition method, surround the skeletal structure formed of a consecutive array of metal grains.

The configurations and the manufacturing methods according to the present invention as described above reduce the overpotential of each electrode and the IR loss, and accordingly improve the electric power generation efficiency.

DETAILED DESCRIPTION OF THE INVENTION

Figure 1:
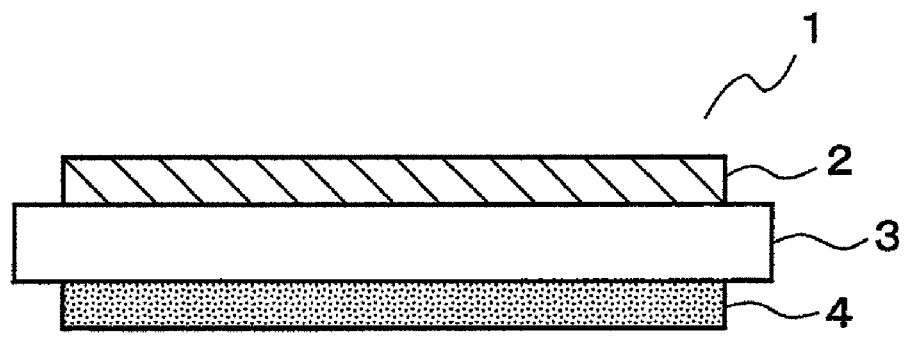
FIG. 1 is a schematic sectional view illustrating the structure of an electric power generation cell involved in the present invention.
Figure 2:
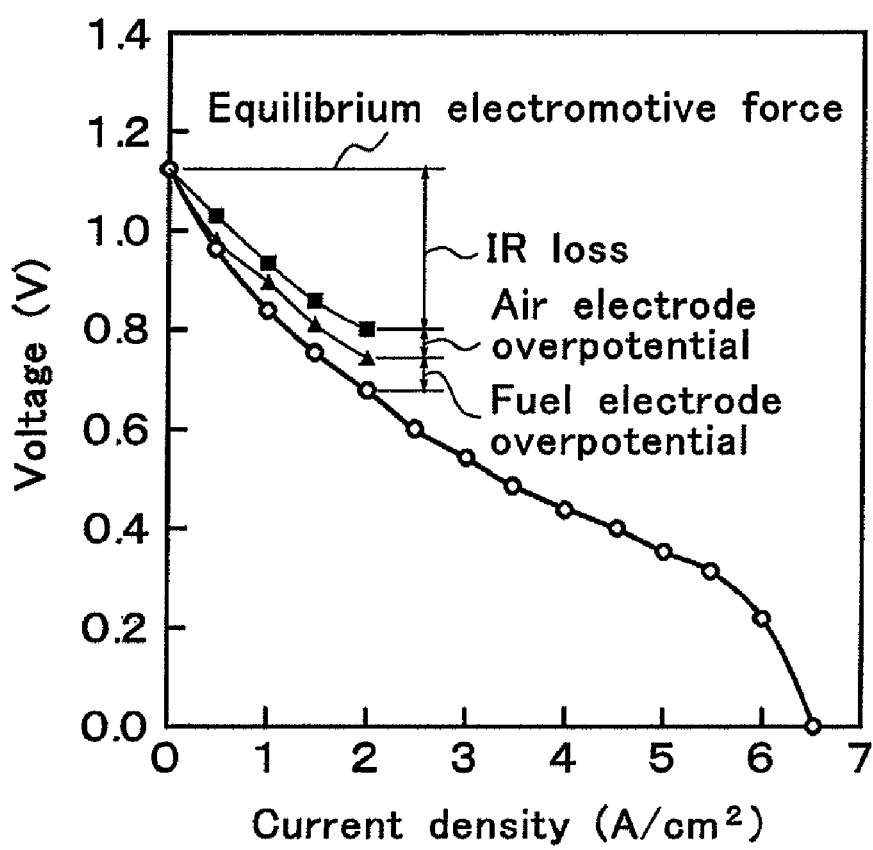
FIG. 2 is a graph showing the electric power generation property of the electric power generation cell of FIG. 1.

Now, a description will be made below of the embodiment of the present invention. FIG. 1 shows the internal structure of an electric power generation cell (single cell) in a solid oxide type fuel cell, and FIG. 2 shows the voltage property (electric power generation property) against the current density of the electric power generation cell.

As shown in FIG. 1, the electric power generation cell 1 of a solid oxide type fuel cell comprises a three-layer structure provided with a porous air electrode layer 2 in contact with the air, a fuel electrode layer 4 in contact with the fuel such as hydrogen gas, and a solid electrolyte layer 3 which is the medium for migration of the oxide ions, and the above described air electrode layer 2 and the above described fuel electrode layer 4 are arranged so as to sandwich the solid electrolyte layer 3.

Here, the above described air electrode layer 2 is a porous sintered compact mainly composed of samarium strontium cobaltite, and is formed of an oxide having a perovskite structure represented by $Sm_cSr_{1-c}CoO_{3-\gamma}$ where $0.1<c<0.9$ (here, 3-γ denotes the number of oxygen atoms).

Additionally, the above described solid electrolyte layer 3 is formed of an oxide ion conductor mainly composed of a lanthanum gallate based oxide having a perovskite structure represented by $La_xSr_{1-x}Ga_yMg_{1-Y-z}MzO_{3-\delta}$ where $0.5<X<1$, $0.7<Y, <1$ and $0<Z<0.1$ (here, M denotes one or more types of metal elements selected from the group consisting of Co, Fe and Ni, and 3-δ denotes the number of oxygen atoms).

Additionally, the above described fuel electrode layer 4 is constituted with a porous sintered compact comprising a skeletal structure formed of a consecutive array of metal grains highly dispersed so as to form a uniformly mixed condition and the mixed conductive oxide grains which cling to the skeletal structure in a surrounding manner.

For the skeletal structure formed of a consecutive array of metal grains, one type of element selected from the group consisting of Ni, Pt and Ru can be used, and in particular, it is preferable that the skeletal structure is the one formed of a consecutive array of metal grains to form a mixed powder of 0.9 μm or less in average grain size. Additionally, the above described mixed conductive grains are an oxide containing cerium represented by $CeO_2$ or $(CeO_2)_{1-a}(LO_n)_a$ where $0<a<0.4$ (here, L is at least one type of cation selected from the group consisting of a monovalent alkali metal cation, a divalent alkaline earth metal cation, and a trivalent rare earth element cation, and n denotes the number of oxygen atoms). The mixed conductive grains have a highly dispersed network structure surrounding a skeletal structure formed of a consecutive array of metal grains, and hence forms the fuel electrode layer having a porous structure with well regulated microstructure. In the present embodiment, a powder having this highly dispersed network structure is produced by the spray thermal decomposition method, and a fuel electrode layer is manufactured by sintering the powder in an oxidative atmosphere at a temperature of 900 to 1,500° C.

In the present invention, by combining the solid electrolyte layer 3 composed of a lanthanum gallate based oxide with the fuel electrode layer 4 made of the highly dispersed network structure in which mixed conductive grains surround the skeletal structure formed of a consecutive array of metal grains, the overpotentials of the electrodes can be reduced greatly as compared to an electric power generation cell having a conventional configuration, and thus the power generation properties of a solid oxide type fuel cell can be improved greatly.

Next, in order to check the above described effect of the present invention, according to the following steps (1) to (3), the electric power generation cells of examples (the present invention) and a comparative example (a conventional example) were manufactured, and the electric power generation properties of the respective cells are compared.

EXAMPLES

Step 1: Fabrication of a Solid Electrolyte Layer

As source materials, $La_2O_3$, $SrCO_3$, $Ga_2O_3$, MgO, and CoO were prepared, weighed out in predetermined amounts, subjected to mixing with the aid of a ball mill, heated in air at 1,200° C. for calcination, and additionally pulverized with the aid of a ball mill, and thus a lanthanum gallate based oxide powder was produced. The lanthanum gallate based oxide powder thus obtained was molded into a thin plate shape with the aid of a method well known in the art such as the doctor blade method and the like, and then heated at 1,450° C. in air; thus the solid electrolyte material plates (Examples 1 to 4) of the compositions and thickness values shown in Table 1 were manufactured.

Step 2: Production of the Fuel Electrode Layer

In each of the present Examples, the fuel electrode layer was produced by the spray thermal decomposition method described below.

Nickel nitrate, cerium nitrate and samarium nitrate were prepared, weighed out in predetermined amounts, and dissolved in water to prepare an aqueous solution. The solution was atomized with the aid of a supersonic atomizer to be introduced into a pipe shaped electric furnace by using air as a carrier gas, where the atomized solution was dried in an oxidative atmosphere at 1,000° C., the nitrates were heat treated and at the same time made to react with each other, and thus a mixture powder (a highly dispersed composite fine grains) was produced which has a grain structure such that composite oxide composed of cerium oxide and samarium oxide adhered to the circumference of fine grains mainly composed of nickel oxide, and has a blending ratio shown in Table 1. The average grain size of the above described nickel oxide grains was set to be 0.9 μm or less, and in the present Examples, the nickel oxide grains of 0.2 to 0.5 μm in average grain size were used.

The highly dispersed composite fine grains were molded in a predetermined thickness on one side of each of the solid electrolyte material manufactured in the above described step 1, with the aid of the method well known in the art such as the screen printing method, and baked in air.

Although, at the stage of baking, the fuel electrode layer is a composite oxide mixture composed of nickel oxide, cerium oxide and samarium oxide, the reductive fuel gas introduced at the time of electric power generation reduces nickel oxide into metallic nickel.

Step 3: Production of the Air Electrode Layer

Strontium carbonate and samarium oxide were prepared, weighed out in predetermined amounts, mixed together with the aid of a ball mill, calcined at 1,000° C. in air, and pulverized with the aid of a ball mill to produce a samarium strontium cobaltite powder having a composition shown in Table 1. The powder thus obtained was molded in a predetermined thickness on the other side of the above described solid electrolyte material plate, with the aid of the method well known in the art such as the screen printing method, and baked in air.

Comparative Example

For the solid electrolyte layer, a conventional stabilized zirconia (YSZ) (specifically, 8% $Y_2O_3$—$ZrO_2$) was used, while for the air electrode layer, a perovskite type oxide material (specifically, $La_{0.9}Sr_{0.1}CoO_3$) was used. In addition, the fuel electrode layer was the same as that in the case of the above described Examples.

When the electric power generation cell of each of the above described Examples 1 to 4 and Comparative Example 1 was operated at the operation temperatures of 800° C. and 660° C., the power generation properties were measured, and the results thus obtained are shown in Tables 2 and 3. Table 2 shows the properties at the operation temperature of 800° C. and the current density of 2,000 mA/cm², while Table 3 shows the properties at the operation temperature of 660° C. and the current density of 1,000 mA/cm².

Table 1 is as shown below.

TABLE 1

Configurations of the electric power generation cells of Examples and Comparative Example

| | Electrolyte | | Fuel electrode | | | |
|---|---|---|---|---|---|---|
| | | | | Blending ratio (molar ratio) between | Average primary | Baking | |
| Specifications | Composition | Thickness (μm) | $Ce_{0.8}Sm_{0.2}O_n$ and Ni ($Ce_{0.8}Sm_{0.2}O_n$:Ni) | grain size (μm) | temperature (° C.) | Thickness (μm) |
| Example 1 | $La_{0.9}Sr_{0.1}Ga_{0.8}Mg_{0.2}O_{3-\delta}$ | 110 | 4:6 | 0.5 | 1250 | 30 |
| Example 2 | $La_{0.8}Sr_{0.2}Ga_{0.8}Mg_{0.15}Co_{0.05}O_{3-\delta}$ | 110 | 5:5 | 0.3 | 1200 | 30 |
| Example 3 | $La_{0.8}Sr_{0.2}Ga_{0.8}Mg_{0.15}Co_{0.05}O_{3-\delta}$ | 100 | 6:4 | 0.2 | 1150 | 100 |
| Example 4 | $La_{0.8}Sr_{0.2}Ga_{0.8}Mg_{0.19}Co_{0.01}O_{3-\delta}$ | 50 | 6:4 | 0.3 | 1250 | 750 |
| Comparative Example 1 | 8% $Y_2O_3$—$ZrO_2$ | 10 | 5:5 | 1 | 1200 | 750 |

| Air electrode | | |
|---|---|---|
| Average primary grain size | Baking temperature | Thickness |

TABLE 1-continued

Configurations of the electric power generation cells of Examples and Comparative Example

| Specifications | Composition | (μm) | (°C.) | (μm) |
|---|---|---|---|---|
| Example 1 | $(Sm_{0.5}Sr_{0.5})CoO_{3-\gamma}$ | 1.2 | 1100 | 30 |
| Example 2 | $(Sm_{0.5}Sr_{0.5})CoO_{3-\gamma}$ | 1.2 | 1100 | 30 |
| Example 3 | $(Sm_{0.5}Sr_{0.5})CoO_{3-\gamma}$ | 1.2 | 1050 | 40 |
| Example 4 | $(Sm_{0.5}Sr_{0.5})CoO_{3-\gamma}$ | 1.2 | 1100 | 40 |
| Comparative Example 1 | $(La_{0.9}Sr_{0.1})CoO_{3-\gamma}$ | 1 | 1000 | 50 |

TABLE 2

Electric power generation properties of the electric power generation cells of Examples and Comparative Example at the operation temperature of 800° C.

Performance for the electric power generation current density of 2,000 mA/cm²

| Specifications | Electric power generation voltage (mV) | IR loss (mV) | Fuel electrode overpotential (mV) | Air electrode overpotential (mV) |
|---|---|---|---|---|
| Example 1 | 670 | 321 | 68 | 42 |
| Example 2 | 674 | 326 | 62 | 41 |
| Example 3 | 701 | 289 | 75 | 43 |
| Example 4 | 800 | 165 | 82 | 40 |
| Comparative Example 1 | 525 | 309 | 132 | 141 |

TABLE 3

Electric power generation properties of the electric power generation cells of Examples and Comparative Example at the operation temperature of 660° C.

Performance for the electric power generation current density of 1,000 mA/cm²

| Specifications | Electric power generation voltage (mV) | IR loss (mV) | Fuel electrode overpotential (mV) | Air electrode overpotential (mV) |
|---|---|---|---|---|
| Example 1 | 644 | 298 | 98 | 66 |
| Example 2 | 650 | 287 | 95 | 68 |
| Example 3 | 670 | 254 | 112 | 66 |
| Example 4 | 708 | 158 | 141 | 65 |
| Comparative Example 1 | 406 | 258 | 205 | 233 |

As can be clearly seen from Tables 2 and 3, in the electric power generation cells of Examples 1 to 4, compared with the electric power generation cell of Comparative Example 1, both electrode overpotential and IR loss are improved, and the respective electric power generation voltages at the current densities of 2,000 mA/cm² and 1,000 mA/cm² are increased drastically.

Therefore, when the electric power generation voltages at these current density points (2,000 mA/cm² or 1,000 mA/cm²) are compared with the voltages corresponding to these current density points on the voltage characteristic behavior curve shown in FIG. 2, it is clear that the voltage properties are obtained in which the electric power generation voltages are generally shored up, and a high voltage can be obtained even for a high current density; thus, the cell configuration of the present invention can be confirmed to drastically improve the electric power generation efficiency.

In addition, the voltage properties of the electric power generation cells for the high temperature operation are improved compared with those for the low temperature operation. This is because the electrode reaction proceeds more smoothly at higher temperatures. Moreover, the IR loss is also improved concurrently with the electrode overpotentials, and this is probably because the highly dispersed network structure, in the fuel electrode layer, made of the mixed conductive oxide grains surrounding the skeletal structure made of a consecutive array of metal grains, improves the adhesivity to the lanthanum gallate based solid electrolyte, and consequently the contact resistance between the solid electrolyte layer and the electrode is decreased.

As described above, according to the present invention, the electric power generation cell is constituted by combining the solid electrolyte layer made of an oxide ion conductor mainly composed of a lanthanum gallate based oxide with the fuel electrode made of the highly dispersed network structure in which the mixed conductive oxide grains surround the skeletal structure made of a consecutive array of metal grains, and consequently the overpotentials of the respective electrodes and IR loss are reduced to improve the electric power generation efficiency, and hence a high performance solid oxide type fuel cell can be actualized.

What is claimed is:

1. A solid oxide fuel cell comprising:
   an electric power generation cell including a solid electrolyte layer, a fuel electrode layer arranged on one side of said solid electrolyte layer and an air electrode layer arranged on another side of said solid electrolyte layer, wherein:
   said solid electrolyte layer is an oxide ion conductor mainly composed of a lanthanum gallate based oxide;
   said fuel electrode layer is a porous sintered compact having a highly dispersed network structure in which a skeletal structure formed of a consecutive array of metal grains is surrounded by mixed conductive oxide grains, wherein the metal grains are nickel grains having an average primary grain size of 0.2 to 0.5 μm; and
   said air electrode layer is a porous sintered compact mainly composed of cobaltite.

2. The solid oxide fuel cell according to claim 1, wherein:
   said solid electrolyte layer is a lanthanum gallate based oxide having a perovskite structure represented by $La_xSr_{1-X}Ga_YMg_{1-Y-Z}MzO_{3-\delta}$ where $0.5<X<1$, $0.7<Y<1$ and $0<Z<0.1$, and where M denotes one or more types of metallic elements selected from the group consisting of Co, Fe, and Ni, and 3-δ denotes the number of oxygen atoms;
   and
   said mixed conductive grains are made of an oxide containing cerium represented by $CeO_2$ or $(CeO_2)_{1-a}(LO_n)_a$ where $0<a<0.4$, and where L denotes at least one type of cation selected from the group consisting of a monovalent alkali metal cation, a divalent alkaline earth metal cation and a trivalent rare earth element cation, and n denotes the number of oxygen atoms.

3. The solid oxide type fuel cell according to claim 1, wherein:

said air electrode layer is made of an oxide mainly composed of samarium strontium cobaltite having a perovskite structure represented by $Sm_cSr_{1-c}CoO_{3-\gamma}$ where $0.1<c<0.9$, and where $3-\gamma$ denotes the number of oxygen atoms).

4. The solid oxide type fuel cell according to claim 2, wherein:

said air electrode layer is made of an oxide mainly composed of samarium strontium cobaltite having a perovskite structure represented by $Sm_cSr_{1-c}CoO_{3-\gamma}$ where $0.1<c<0.9$, and where $3-\gamma$ denotes the number of oxygen atoms.

5. A method of manufacturing a solid oxide fuel cell, the method comprising:

arranging a fuel electrode layer on one side of a solid electrolyte layer, the solid electrolyte layer being an oxide ion conductor mainly composed of a lanthanum gallate based oxide, the fuel electrode layer being a porous sintered compact having a highly dispersed network structure in which a skeletal structure formed of a consecutive array of metal grains is surrounded by mixed conductive oxide grains, wherein the metal grains are nickel grains having an average primary grain size of 0.2 to 0.5 µm; and arranging an air electrode layer on another side of the solid electrolyte layer so as to form an electric power generation cell, the air electrode layer being a porous sintered compact mainly composed of cobaltite, wherein the fuel electrode layer is manufactured by sintering, in an oxidative atmosphere at a temperature of 900° C. to 1,500° C., a powder having a highly dispersed network structure in which mixed conductive oxide grains produced by the spray thermal decomposition method surround the skeletal structure formed of a consecutive array of metal grains.

* * * * *